United States Patent [19]

Adams et al.

[11] Patent Number: 4,577,275

[45] Date of Patent: Mar. 18, 1986

[54] FLIGHT DIRECTOR GO-AROUND MODE

[75] Inventors: Don L. Adams, Fairfield; Charles W. Evans, Norfolk; Stuart C. Wright, Woodbridge, all of Conn.

[73] Assignee: United Technologies Corporation, Hartford, Conn.

[21] Appl. No.: 499,682

[22] Filed: May 31, 1983

[51] Int. Cl.⁴ ............................................. G06F 15/50
[52] U.S. Cl. .................................... 364/433; 364/427; 364/428; 244/181; 244/182; 244/17.13; 73/178 T
[58] Field of Search ............... 364/433, 434, 439, 440, 364/427–430; 244/180–183, 194, 17.13; 73/178 R, 178 T, 178 H; 340/969, 970, 977, 978

[56] References Cited

U.S. PATENT DOCUMENTS

| | | | |
|---|---|---|---|
| 3,801,049 | 4/1974 | Simpson et al. | 364/429 |
| 3,805,033 | 4/1974 | Manke et al. | 364/429 |
| 3,822,047 | 7/1974 | Schuldt, Jr. | 244/181 |
| 3,847,328 | 11/1974 | Simpson et al. | 364/429 |
| 3,927,306 | 12/1975 | Miller | 364/430 |
| 4,319,219 | 3/1982 | Rein-Weston | 73/178 T |
| 4,326,253 | 4/1982 | Cooper et al. | 364/428 |
| 4,347,572 | 8/1982 | Berwick, Jr. et al. | 364/433 |

Primary Examiner—Gary Chin
Attorney, Agent, or Firm—Gerald E. Linden

[57] ABSTRACT

An improved flight director go-around mode adjusts the collective stick position in a closed loop to increase lift to a desired value. If the engagement airspeed is below the maximum rate of climb airspeed, the airspeed is increased towards the maximum rate of climb airspeed at a moderate rate. When the maximum rate of climb airspeed is attained, or if the engagement airspeed is at least the maximum rate of climb airspeed, and the rate of climb is satisfactory, the airspeed is maintained. If the engagement airspeed is greater than the maximum rate of climb airspeed and the desired rate of climb is not achieved within ten seconds, the airspeed is decreased towards the maximum rate of climb airspeed. Heading or course is automatically maintained when go-around is engaged.

4 Claims, 4 Drawing Figures

FLIGHT DIRECTOR GO-AROUND MODE

TECHNICAL FIELD

This invention relates to aircraft flight directors and more particularly to providing an improved go-around mode.

BACKGROUND ART

In the main hereinafter the control of helicopters is discussed, but the teachings disclosed herein are relevant to aircraft generally.

For various reasons a pilot may decide to abort a landing approach or, in other words, initiate a "go-around". Under manual control the pilot pulls up on the collective stick to increase lift and, in a slow speed approach, may pitch the helicopter forward to increase air speed to facilitate lift. The most salient objective in a go-around is to clear obstacles, such as buildings, power lines or trees.

A flight director is responsive to various dynamic aircraft conditions and, in some instances, to signals originating from the landing field, and is operable to control the overall descent of the helicopter in a landing approach. It is known to provide a go-around mode in the flight director to initiate a go-around in response to a switch closure by the pilot.

The go-around mode has been implemented using an open loop approach to command the collective stick to a pre-determined position to establish a rate of climb. The rate of climb is related to the "power required" curve of the aircraft. For example, in a Sikorsky S-76 helicopter, the least amount of power is required to climb at 74 knots which is known as the "maximum rate of climb airspeed". Therefore it is known to establish closed-loop control over the airspeed to achieve a reasonable airspeed, such as 65 knots, while commanding the predetermined fixed amount of collective, and then optimizing the airspeed. When pitching nose-down to increase airspeed, much of the collective increase may be manifested in the airspeed axis rather than in the lift axis. The resulting rate of climb varies with aircraft loading and with the engagement air speed and, in fact, may be neutral or negative, thereby causing a lag in aircraft response. A lag in gaining altitude not only increases pilot workload, since a valuable g-response cue is lacking, but also can be dangerous.

DISCLOSURE OF INVENTION

I herefore, it is an object of this invention to provide an improved helicopter go-around mode that will guarantee a positive rate of climb immediately, independent of aircraft loading and engagement airspeed. It is a further object of this invention to provide the improved go-around mode as an improvement to an existing flight director, especially one having a go-around mode and associated engagement switch.

According to the invention, when a go-around is commanded, the present heading/course of the aircraft is locked onto and maintained. Simultaneously, the collective stick position is adjusted (incremented) to increase the lift of the helicopter to a predetermined amount. If the engagement airspeed is below a predetermined airspeed, such as the maximum rate of climb airspeed, the airspeed is increased towards the maximum rate of climb airspeed at a moderate rate. When the maximum rate of climb airspeed is attained, or if the engagement airspeed is at least the maximum rate of climb airspeed, and the rate of climb is satisfactory, the airspeed is maintained. If the engagement airspeed is greater than the maximum rate of climb airspeed and the desired rate of climb is not achieved within ten seconds, the airspeed is decreased towards the maximum rate of climb airspeed.

The invention may be implemented utilizing analog, digital or computer signal processing, employing only apparatus and techniques which are well within the skill of the art in the light of the teachings which follow hereinafter with respect thereto.

The foregoing and other objects, features and advantages of the present invention will become more apparent in the light of the following detailed description of an exemplary embodiment thereof.

BEST MODE FOR CARRYING OUT THE INVENTION

Figure 1:
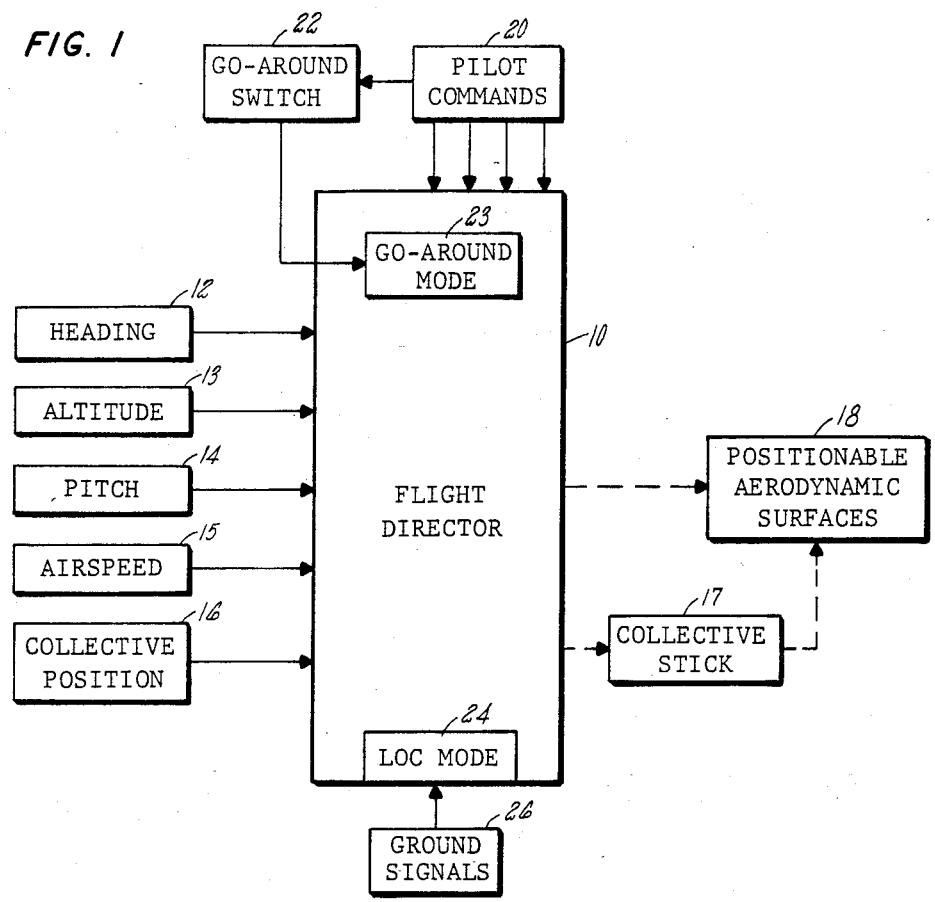
FIG. 1 is a block diagram of a flight director in association with an aircraft.

In FIG. 1 is shown a flight director 10 that is responsive to heading, altitude (and vertical rate), attitude (e.g., pitch), and airspeed signals from sensors 12–15, respectively, and is operable to control the heading, lift (climb/descent), attitude and airspeed of an aircraft, such as a helicopter, by positioning positionable aerodynamic surfaces 18 which, in the case of helicopters, are the main and tail rotors. The flight director 10 is also responsive to the collective stick position as indicated by a position sensor 16 and is operable to control the position of the collective stick 17 to control lift. The collective stick position may be specified as an angle. The flight director has a channel for controlling the aircraft in each control axis, and control in each axis is dependent upon control signals which are derived from error signals that are generated when an actual flight parameter(e.g., heading) varies from a selected or desired value. The control signals are also affected by commands (signals) 20 that are provided by the pilot and commands from a go-around mode 23 in the flight director. For instance, a channel for controlling the lift (climb/descent) of the aircraft is responsive to a collective command, a channel for controlling the airspeed of the aircraft is responsive to a pitch command (pitch controls airspeed in a helicopter), and a channel for maintaining the heading/course of the aircraft is responsive to a heading hold command. A go-around switch 22 provides a go-around signal to the flight director 10, in response to a pilot input, to engage the flight director go-around mode 23, which is discussed in detail hereinafter.

In its localizer (LOC) mode 24, the flight director 10 is responsive to ground signals 26 to guide the helicopter along a predetermined course, such as in a landing approach. A localizer beam provides fly left/right guidance about the center line of the approach path. In a NAV mode (not shown) a course is dialed in (selected) by the pilot and that course is automatically maintained by the flight director. In either case, the heading may vary from the course (aircraft "crabbed") due to a crosswind component or advertent pilot override of the automatic function via input to the yaw pedals. The flight director 10 is also operable to maintain a heading (heading hold).

Figure 2A:
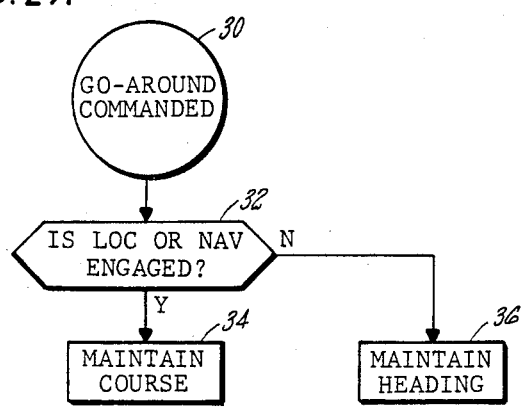
FIG. 2A is a flow chart of the heading portion of this invention.

With reference to FIG. 2A, when a go-around is commanded at a step 30, it is determined in a test 32 whether the LOC or NAV mode is engaged. If either are engaged the system automatically locks onto the existing course at a step 34. If neither is engaged the go-around mode automatically engages heading hold at a step 36. Generally heading hold is disengaged during a landing maneuver. In either case, when go-around is commanded, the pilot workload is reduced since heading/course is maintained automatically by providing the heading hold command. This allows for closer pilot attention to the most important aspect of a go-around, i.e. avoidance of contact with buildings, power lines, and the like.

Figure 2B:
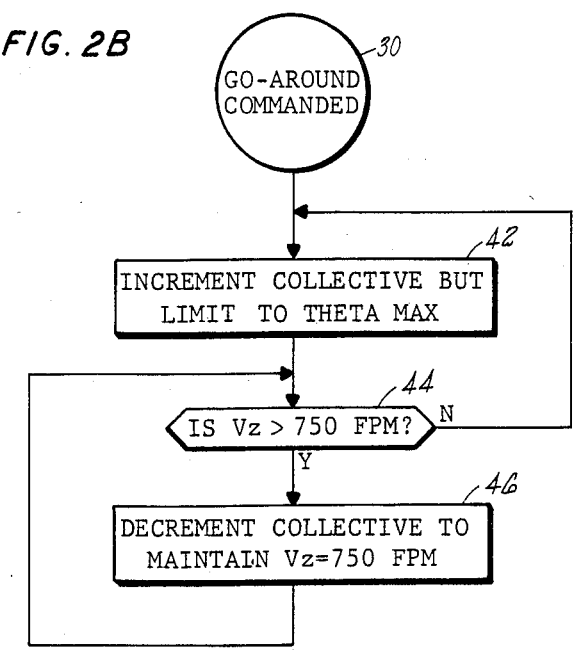
FIG. 2B is a flow chart of the lift portion (vertical loop) of this invention.

In FIG. 2B is shown the vertical loop of the go-around mode routine which is accessed via the step 30. At a step 42 the angle of the collective stick is increased (incremented) in response to the collective command to increase lift, but is never permitted to exceed a limit, such as theta max. Theta max is the maximum stick angle to which the collective stick can be raised without getting into over-torquing problems. This is determined empirically and on the S-76 corresponds to approximately 75% torque. It is desirable that there be no lag between commanding go-around and achieving collective stick motion 42. This provides the pilot with a valuable cue as to the engagement of the go-around mode.

The vertical loop is closed around climb rate. In a test 44 it is determined whether a climb rate (Vz) of 750 feet per minute has been achieved. If not, the routine loops back through the step 42 to command more collective. In this manner the system commands a definite positive rate of climb and maintains it in a closed loop fashion. If the rate of climb has reached, or exceeds, 750 feet per minute the collective stick is backed off (decremented) to maintain the desired rate of climb. The nominal rate of climb is selected (predetermined) according to helicopter performance limits and pilot comfort levels and has, on the S-76, been selected at 750 feet per minute. The vertical loop is the primary loop and dominates over the airspeed loop, which is discussed hereinafter. If a situation arises where the two are trading each other off, rate of climb will be optimized at the expense of airspeed. In practice, it should not be necessary to command the collective stick to theta max to achieve the desired rate of climb. Therefore a collective stick angle of theta max is indicative of a climbing problem. This may be due to engagement of the go-around mode at an airspeed which is not the optimum rate of climb airspeed for the particular aircraft. Therefore, an airspeed loop is provided.

Figure 2C:
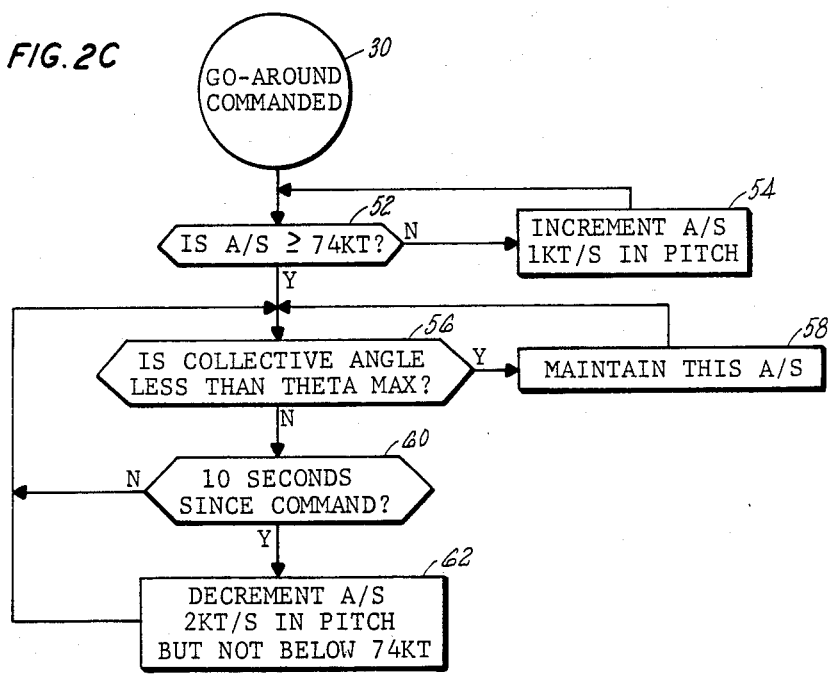
FIG. 2C is a flow chart of the airspeed portion (loop) of this invention.

In FIG. 2C is shown the airspeed loop of the go-around mode. When go-around is commanded at a step 30 it is determined (measured) in a test 52 whether the airspeed is greater than or equal to 74 knots, which is the maximum rate of climb airspeed. At that airspeed the least amount of collective is needed in order to achieve a desired rate of climb. It is the most efficient climbing airspeed. If the helicopter is having difficulty achieving the desired rate of climb, the airspeed is adjusted towards 74 knots. The likelihood of achieving and maintaining the desired rate of climb is therefore related to the airspeed.

If go-around is commanded during an approach to landing that is below 74 knots, there is a presumption that the helicopter will not be able to maintain the desired rate of climb. Therefore, at a step 54, the helicopter is nosed over slightly in the pitch axis in response to the pitch command to increase the forward velocity at a moderate rate, such as one knot per second to enhance the aircraft's climbing ability. A moderate rate is selected because of the possibility that an energy trade-off between airspeed and lift may adversely affect the climbing ability of the helicopter.

When the maximum rate of climb airspeed is attained, or if the engagement airspeed is at least 74 knots, it is determined in a test 56 whether the collective stick angle is less than theta max. As discussed hereinbefore, a collective stick angle of less than theta max is indicative of a satisfactory rate of climb. Therefore, at a step 58 the airspeed is maintained in the pitch axis. If it were desired to reduce the airspeed to the maximum rate of climb airspeed (in the case of engagement in excess of that airspeed), this could be done.

On the other hand, since a collective stick angle of theta max is indicative of a climbing problem, it is determined in a test 60 whether a predetermined time interval, such as ten seconds, has elapsed since go-around was commanded. If not, the routine loops back and waits before commanding a deceleration at a step 62. If ten seconds has elapsed, the airspeed is decreased at a substantial rate, such as two knots per second, at a step 62. However, the speed is not decreased below the maximum rate of climb airspeed. It is desirable to wait before decelerating the aircraft at a step 62 to allow time for the aircraft to respond to the initial collective input and to stabilize rate of climb.

It should be understood that the use of the go-around mode is not limited to approaches to landing but may also be used when the pilot is flying from waypoint to waypoint and desires automatically to gain altitude while maintaining heading/course with a minimum pilot workload.

The digital functions indicated by the simplified flow charts of FIG. 2 are straightforward and capable of implementation in even the simplest of digital computers in either simplex or multicomputer systems, of a variety of architectural types, employing wellknown programming techniques or in a dedicated digital device.

The foregoing description of this invention is intended to enable those skilled in the art to practice the invention. Although the invention has been shown and described with respect to an exemplary embodiment, it should be understood that various other embodiments and modifications as are suited to the particular use contemplated will become apparent upon examination and practice of the invention and various changes, omissions and additions may be made therein and thereto, without departing from the spirit and scope of the invention.

What is claimed is:

1. A flight director having a channel for controlling the lift (climb/descent) of an aircraft in response to a collective command and having a channel for controlling the airspeed of the aircraft in response to a pitch command, comprising:

a switch for providing a go-around signal in response to a pilot input;

altitude means for providing a rate signal indicative of the aircraft vertical rate;

airspeed means for providing an airspeed signal indicative of the aircraft airspeed; and signal processing means connected for response to the switch, the altitude means and the airspeed means, for providing the collective command in response to the go-around signal to cause the aircraft to climb at a predetermined rate as indicated by the rate signal, for providing the pitch command to increase the airspeed of the aircraft in response to the go-around signal when the airspeed signal is indicative of an airspeed that is less than a predetermined airspeed, such as the maximum rate of climb airspeed of the aircraft, and for providing the pitch command to decrease the airspeed in response to the go-around signal only when the airspeed signal is indicative of an airspeed that is greater than the predetermined airspeed and if the predetermined rate of climb is not achieved within a predetermined time interval after go-around was commanded by the pilot.

2. A flight director as claimed in claim 1 that comprises a channel for maintaining the heading/course of the aircraft in response to a heading hold command and wherein the signal processing means comprises means for providing the heading hold command in response to the go-around signal.

3. A flight director as claimed in claim 1 that comprises a position sensor for sensing the angle of the collective stick and wherein the collective command controls the lift of the aircraft by incrementing/decrementing the angle of a collective stick and is limited such that a predetermined collective stick angle is not exceeded.

4. A method of providing a go-around mode in a flight director that is operable to control the lift (climb/descent) of an aircraft in response to a collective command and having a channel for controlling the airspeed of the aircraft in response to a pitch command, comprising:

providing a go-around signal to the flight director indicative of a pilot command to engage go-around;

incrementing the collective control angle in response to the go-around signal, but not beyond a limit, to increase the lift of the aircraft to achieve a predetermined rate of climb;

measuring the airspeed of the aircraft;

increasing the airspeed of the aircraft in response to the go-around signal if the airspeed is below a predetermined airspeed, such as the maximum rate of climb airspeed;

maintaining the airspeed in response to the go-around signal in the case where the airspeed is greater than the predetermined airspeed and a sufficient predetermined rate of climb is achieved; and decreasing the airspeed in response to the go-around signal only in the case where the airspeed is greater than the predetermined airspeed and if the predetermined rate of climb is not achieved within a predetermined time interval after go-around was commanded by the pilot.

* * * * *